(12) United States Patent
Yanagihara et al.

(10) Patent No.: US 12,623,294 B2
(45) Date of Patent: May 12, 2026

(54) PROCESSING TOOL

(71) Applicant: SUGINO MACHINE LIMITED, Namerikawa City (JP)

(72) Inventors: Yusuke Yanagihara, Namerikawa City (JP); Mitsuru Muto, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 691 days.

(21) Appl. No.: 17/954,669

(22) Filed: Sep. 28, 2022

(65) Prior Publication Data

US 2023/0124359 A1    Apr. 20, 2023

(30) Foreign Application Priority Data

Oct. 14, 2021    (JP) ................................. 2021-168775

(51) Int. Cl.
B23B 31/08       (2006.01)
B23B 31/107     (2006.01)
B23B 51/10          (2006.01)

(52) U.S. Cl.
CPC ........ B23B 31/083 (2013.01); B23B 31/1071 (2013.01); B23B 31/10741 (2021.01);
(Continued)

(58) Field of Classification Search
CPC .. B23B 31/083; B23B 31/1071; B23B 51/101
See application file for complete search history.

(56) References Cited

U.S. PATENT DOCUMENTS

| | | | | |
|---|---|---|---|---|
| 3,521,314 A | * | 7/1970 | Steiner ...................... | F16D 7/10 |
| | | | | 408/139 |
| 3,751,051 A | * | 8/1973 | Schmidt .............. | B23B 31/1071 |
| | | | | 408/239 R |

(Continued)

FOREIGN PATENT DOCUMENTS

| | | |
|---|---|---|
| DE | 202016100106 U1 | 3/2016 |
| EP | 3819075 A1 | 5/2021 |

(Continued)

OTHER PUBLICATIONS

Office Action mailed on Oct. 11, 2022 in a corresponding Japanese Patent Application No. 2021-168775 (10 pages).

(Continued)

*Primary Examiner* — Sunil K Singh
*Assistant Examiner* — Eric Daniel Whitmire
(74) *Attorney, Agent, or Firm* — United IP Counselors, LLC

(57)    ABSTRACT

A deburring tool includes a body including a cylinder chamber having a tool holder holding hole, and an anti-rotation body holding hole; a tool holder having an anti-rotation groove and disposed in the cylinder chamber to reciprocate in the cylinder chamber; a first elastic body disposed inside the cylinder chamber to urge the tool holder toward a distal end; a cover disposed outside the body to reciprocate between a detaching position and a processing position, the cover including, a pressing surface that covers the anti-rotation body holding hole at the processing position, and a relief portion; and an anti-rotation body accommodated in the relief portion when the cover is positioned at the detaching position and the tool holder is pulled from the tool holder holding hole.

12 Claims, 10 Drawing Sheets

(52) U.S. Cl.
CPC ......... *B23B 51/101* (2013.01); *B23B 2220/08* (2013.01); *B23B 2260/022* (2013.01); *B23B 2260/136* (2013.01)

(56) References Cited

U.S. PATENT DOCUMENTS

| | | | |
|---|---|---|---|
| 4,041,729 | A | 8/1977 | Bilz |
| 4,184,692 | A | 1/1980 | Benson et al. |
| 4,188,041 | A | 2/1980 | Soderberg |
| 4,273,344 | A | 6/1981 | Benson et al. |
| 5,934,846 | A * | 8/1999 | Ishii ................... B23B 31/1071 279/81 |
| 2017/0209973 | A1* | 7/2017 | Chen ................. B23B 31/20125 |

FOREIGN PATENT DOCUMENTS

| | | | |
|---|---|---|---|
| JP | S48-67378 | U | 8/1973 |
| JP | S49-36059 | Y1 | 10/1974 |
| JP | S50-305 | A | 1/1975 |
| JP | S50-4910 | B1 | 2/1975 |
| JP | S54-9074 | A | 1/1979 |
| JP | 2000-15508 | A | 1/2000 |
| JP | 3609054 | B2 | 1/2005 |
| JP | 2014-210337 | A | 11/2014 |
| JP | 6025580 | B2 | 11/2016 |
| JP | 2016-203371 | A | 12/2016 |
| JP | 2020-6460 | A | 1/2020 |

OTHER PUBLICATIONS

Extended European Search Report mailed on Feb. 27, 2023 in corresponding European Patent Application No. 22199759.6 (11 pages).

* cited by examiner

PROCESSING TOOL

CROSS-REFERENCE TO RELATED APPLICATIONS

This application claims the benefit of priority to Japanese Patent Application No. 2021-168775, filed on Oct. 14, 2021, the entire contents of which are hereby incorporated by reference.

BACKGROUND

1. Technical Field

The present invention relates to a processing tool.

2. Description of the Background

Conventionally, a deburring tool capable of adjusting a pressing force of a cutting tool against a workpiece has been proposed (for example, Japanese Patent No. 6025580). The conventional deburring tool includes: a stem received in a shank in an axially movable manner, a cutting tool guide means for guiding a cutting tool holding means in an axially movable manner relative to the stem to rotate in a rotational direction integrally with the stem, a spring member for urging the cutting tool holding means in a direction of pressing the workpiece against the stem, and an initial length adjusting means for adjusting the pressing force by the spring member by adjusting the initial length of the spring member.

BRIEF SUMMARY

An object of the present invention is to provide a processing tool having a simple structure, to which a tool holder is detachably attachable, and capable of sliding a tool in an axial direction with respect to a body.

A first aspect of the present invention provides a processing tool, including:

a body extending along a body center axis, the body including
a cylinder chamber located inside the body and extending along the body center axis, the cylinder chamber having a tool holder holding hole having an opening toward a distal end, and
an anti-rotation body holding hole radially penetrating the body;
a tool holder having an anti-rotation groove formed on an outer peripheral of the tool holder, the tool holder disposed in the cylinder chamber, the tool holder configured to reciprocate in the cylinder chamber;
a first elastic body disposed inside the cylinder chamber, the first elastic body configured to urge the tool holder toward a distal end;
a cover disposed outside the body, the cover configured to reciprocate along the body center axis between a detaching position and a processing position, the cover including,
a pressing surface configured to cover the anti-rotation body holding hole at the processing position, and
a relief portion recessed from an inter side of the cover to radially outward; and
an anti-rotation body held in the anti-rotation body holding hole, the anti-rotation body configured to move between the anti-rotation groove and the pressing surface, the anti-rotation body configured to be accommodated in the relief portion when the cover is positioned at the detaching position and the tool holder is pulled from the tool holder holding hole.

The processing tool is, for example, a deburring tool, a drilling tool, a threading tool, or a brush. The deburring tool is attached to the processing machine to remove burrs adhered to the workpiece. The processing machine is, for example, a robot having a tool spindle, a lathe, a machining center, and a turning center. The shank of the deburring tool is attached to a tool spindle or a tailstock, and the entire deburring tool rotates with the tool spindle.

For convenience of explanation, a side to which a cutting tool or a brush is attached is referred to as a distal end side, and a side on which a shank is disposed is referred to as a basal end side.

The body, the pusher, the tool holder and the tool are arranged on a shank axis which is a central axis of the shank. The anti-rotation body is held in the anti-rotation body holding hole. The anti-rotation body transmits the rotational torque applied to the body to the tool holder via the anti-rotation groove.

The pusher and the tool holder are urged toward the distal end by the restoring force of the first elastic body.

One or more anti-rotation grooves are formed on the tool holder. The anti-rotation groove is formed on an outer peripheral surface of the tool holder. The anti-rotation groove is formed parallel to or spirally with the shank axis. The anti-rotation groove may have appropriately any shape in which the anti-rotation body is slidable. The plurality of anti-rotation grooves are arranged in a rotating symmetry. Preferably, a plurality of anti-rotation grooves are formed on the tool holder.

The body has the same number of the anti-rotation body holding holes as the anti-rotation body. The anti-rotation body holding hole penetrates the body.

The anti-rotation body holding hole has an anti-rotation body holding surface. The shape of the anti-rotation body holding surface is a cylindrical surface or a conical surface that decreases in diameter toward the inner peripheral side. Preferably, the anti-rotation body holding surface is a cylindrical surface. The anti-rotation body holding surface is inclined with the rotation direction of the tool with respect to the radial direction.

A cover covering the outer peripheral surface of the body may be provided. The cover reciprocates along the body center axis between a detaching position of the tool holder and a processing position for holding the tool holder. The cover may be provided on either the basal end side or the distal end side. Preferably, the cover is provided on the basal end side.

The anti-rotation body holding hole has an anti-rotation body retaining portion at an inner peripheral side opening of the anti-rotation body holding surface. Preferably, the anti-rotation body retaining portion has a curved surface in conformity with the anti-rotation body. The anti-rotation body retaining portion may be formed integrally with the anti-rotation body holding surface. When the tool holder is detached from the body, the anti-rotation body retaining portion prevents the anti-rotation body from falling into the body.

The anti-rotation body moves on the anti-rotation body holding surface, the pressing surface on the inner circumference of the cover, and the anti-rotation groove. Preferably, 20 to 45% of the diameter of the anti-rotation body protrudes from the body when the cover is at the processing position.

The anti-rotation body is preferably a ball or a pin member. The anti-rotation grooves are arranged in the same number as the anti-rotation body or in a number of natural multiples of the number of anti-rotation bodies. In the case where the anti-rotation body is a pin member, the end surface on the tool holder side may be a spherical surface, and the end surface on the cover side may be a spherical surface or a flat surface.

The tool holder slides along the anti-rotation groove.

The tool is, for example, a deburring cutter, a drill for drilling, a tap for threading, or a brush. The shape of the tool is appropriately selected in accordance with the shape of the workpiece to be processed.

The relief portion is a space provided in the cover so that the anti-rotation body moves away from the anti-rotation groove on the tool holder toward the outer peripheral side of the body. The relief portion may be located on an inner peripheral surface of the cover. The relief portion is, for example, a circumferential groove or a spherical surface. The circumferential groove may open toward the end face and have a larger diameter.

The processing tool may include a stopper.

When the tool holder is attached to the body, the tool holder is pushed into the body, and the anti-rotation body is held in the anti-rotation groove.

When the tool holder is detached from the body, the anti-rotation body is moved to the relief portion by sliding the cover. Then, the holding of the tool holder by the anti-rotation body is released. The tool holder is thus detached from the piston.

The processing tool according to the present invention allows the tool holder to be detachably attached with a simple structure, and allows the tool to be vertically slid with respect to the body.

BRIEF DESCRIPTION OF DRAWINGS

FIG. 4A is a perspective view of the tool holder of the first embodiment, and FIG. 4B is a perspective view of the tool holder of the modification.

DETAILED DESCRIPTION

First Embodiment

Figure 1:
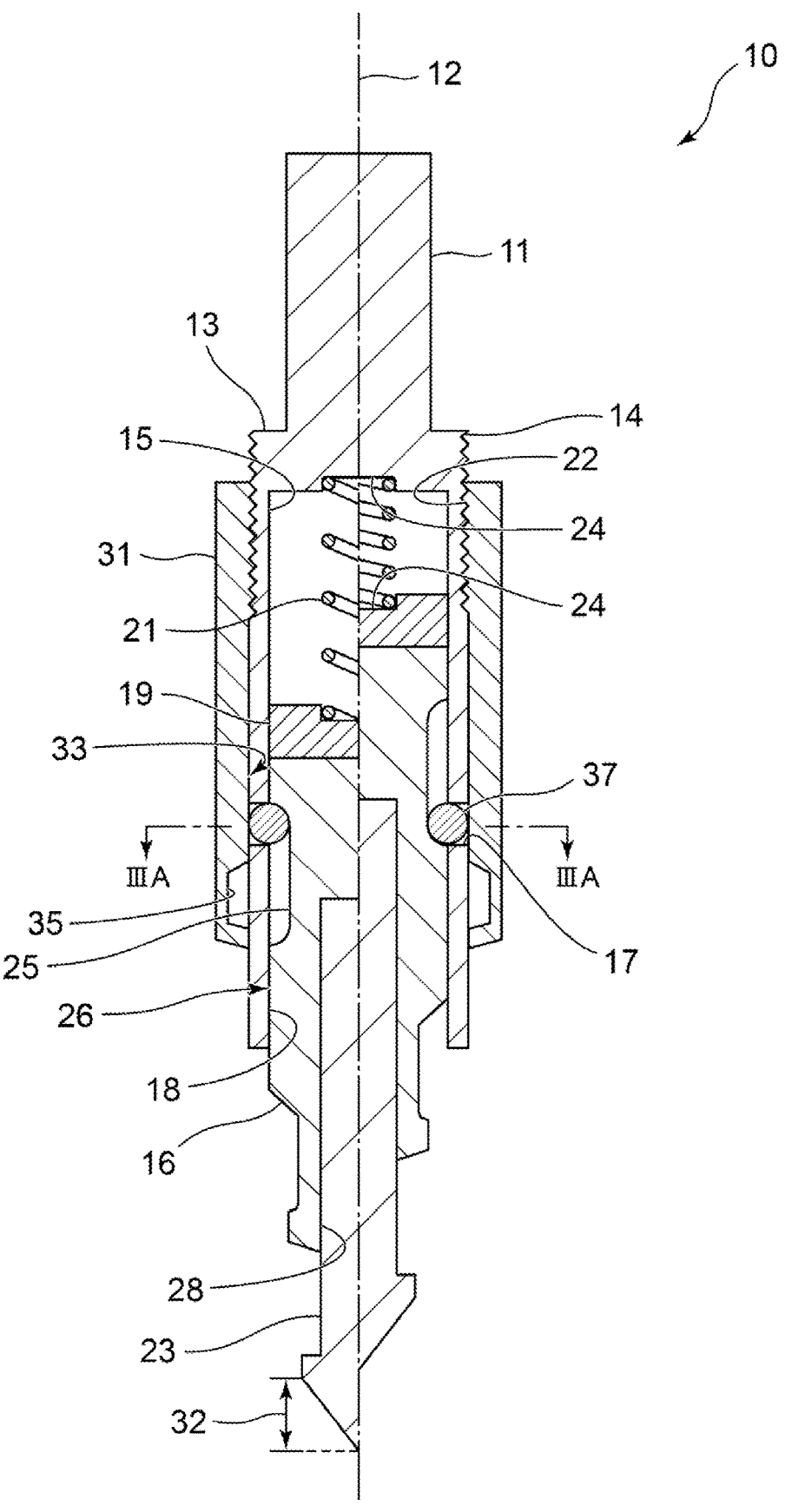
FIG. 1 is a longitudinal sectional view of a deburring tool of a first embodiment during processing.

A processing tool 10 of the present invention is, for example, a deburring tool, a drilling tool, a threading tool, or a brush. Hereinafter, in the present embodiment, a deburring tool 10, which is an example of the processing tool 10, will be described. As shown in FIG. 1, the deburring tool 10 of the present embodiment includes a shank 11, a body 13, a tool holder 16, a anti-rotation body (ball) 37, and a cover 31. A right half of FIG. 1 shows a state in which the tool holder 16 slides toward the shank 11.

The shank 11 extends along a shank axis 12. The body 13 is connected to the shank 11. The body 13, which has a cylindrical shape, has a cylinder chamber 15 therein. A first elastic body 21 (compression coil spring) and a pusher 19 are disposed in the cylinder chamber 15.

The body 13 extends along a body center axis. The body center axis is aligned with the shank axis 12. The body 13 has a cylinder chamber 15, a tool holder holding hole 18, and two anti-rotation body holding holes (ball holding holes) 17. The body 13 may have an external thread portion 14. The external thread portion 14 is disposed on a basal end portion of the body 13. The body 13 has a hollow cylindrical shape. The cylinder chamber 15 is an internal cavity of the body 13. The cylinder chamber 15 extends along the shank axis 12. Preferably, the cylinder chamber 15 has a cylindrical shape. The cylinder chamber 15 has the tool holder holding hole 18 at its distal end. The tool holder holding hole 18 extends along the shank axis 12.

Figure 2:
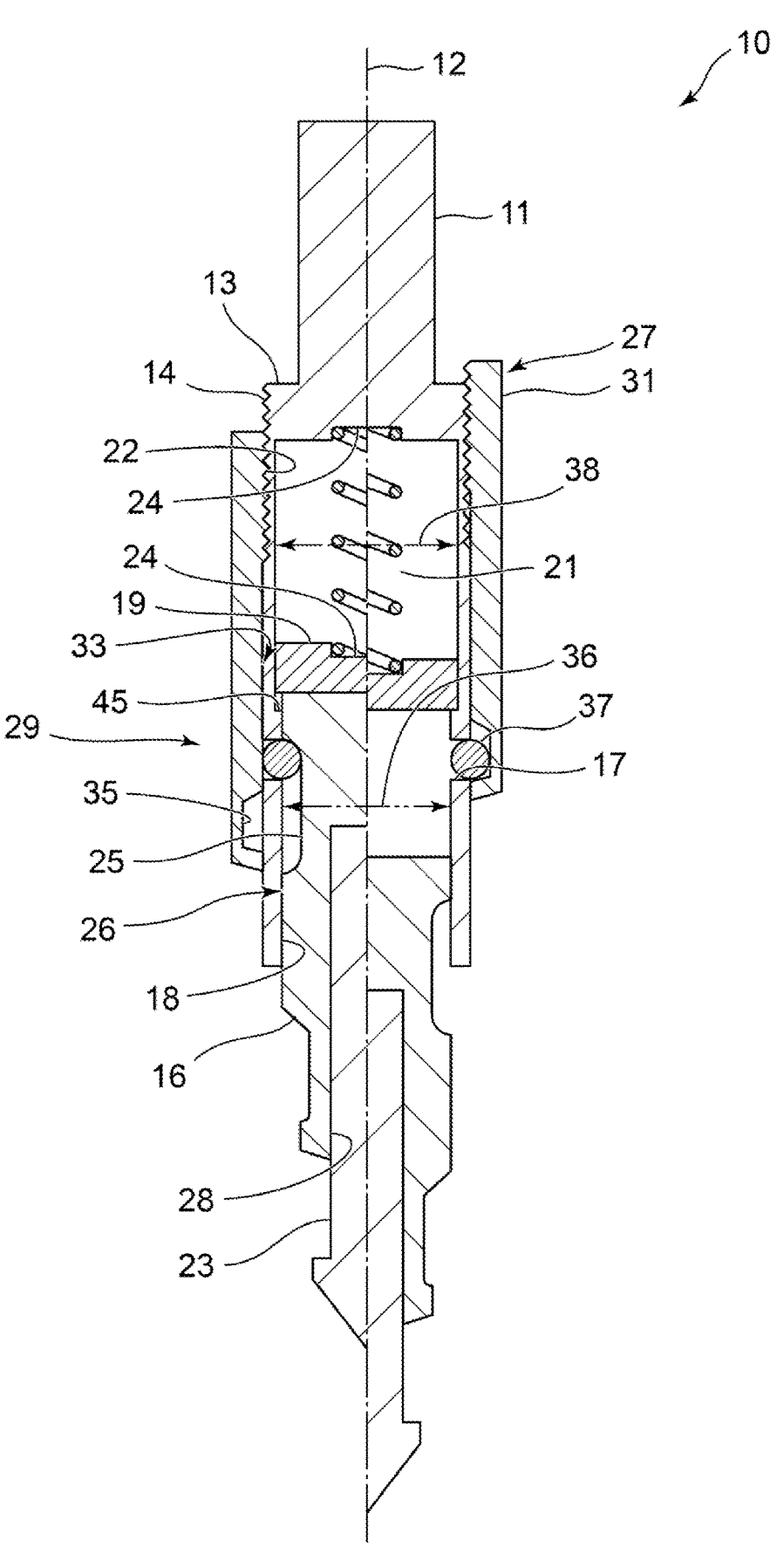
FIG. 2 is a longitudinal sectional view of a modification of the first embodiment during attaching or detaching.

An inner diameter of the tool holder holding hole 18 may be the same as or smaller than the inner diameter of the cylinder chamber 15. FIG. 2 shows a modification in which the size of an inner diameter 36 of the tool holder holding hole 18 is smaller than an inner diameter 38 of the cylinder chamber 15. In the present modification, a step portion 45 is located in the cylinder chamber 15. A right half of FIG. 2 shows a state in which the tool holder 16 is detached. As shown in the right half of FIG. 2, the step portion 45 prevents the pusher 19 pushed out by the first elastic body 21 from falling off when the tool holder 16 is detached.

Returning to FIG. 1, the anti-rotation body holding hole 17 may radially penetrate the body 13 from an outer peripheral surface of the body 13 to the tool holder holding hole 18. The anti-rotation body holding hole 17 each has an anti-rotation body holding surface 39 to hold a single anti-rotation body 37.

The cylinder chamber 15 may have a spring holding hole 24 at a center portion of a basal end surface (bottom surface). The pusher 19 may have a spring holding hole 24 at a central of the upper surface. Each spring holding hole 24 holds the first elastic body 21.

The tool holder 16 has an outer cylindrical surface 26, two anti-rotation grooves 25, and a tool holding hole 28. The tool holder 16 holds the tool 23. The tool holder 16 has a cylindrical shape. The outer cylindrical surface 26 slides with the tool holder holding hole 18 in the direction of the shank axis 12.

Figure 3A:
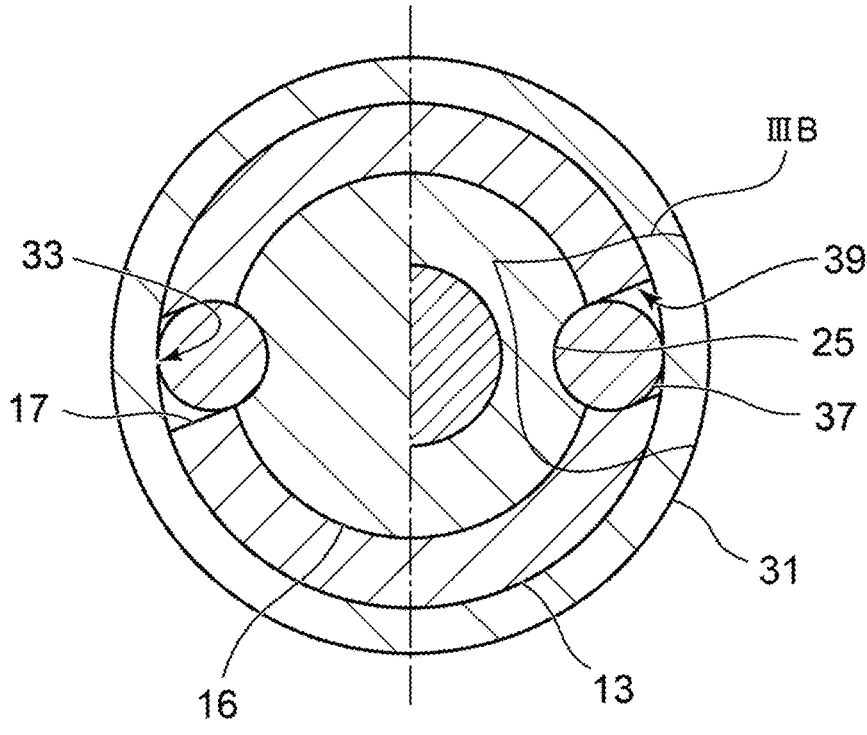
FIG. 3A is a sectional view taken along line IIIA-IIIA in FIG. 1.
Figure 3B:
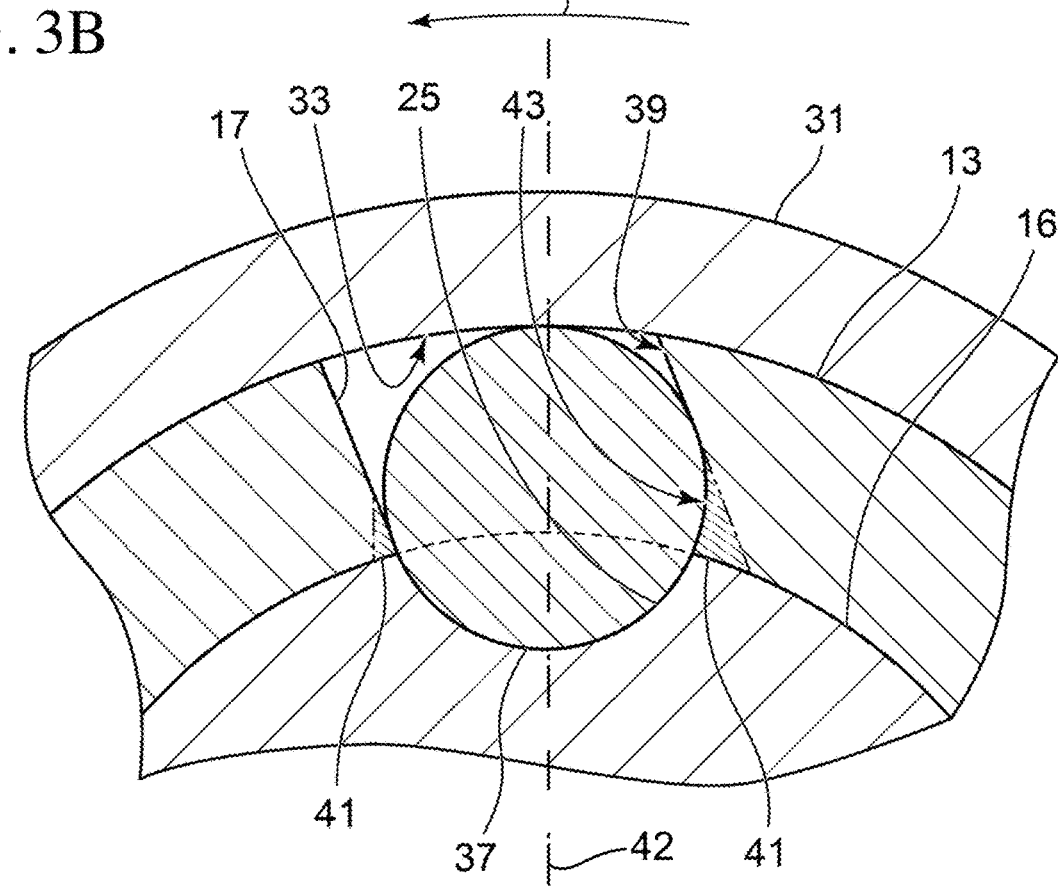
FIG. 3B is a partial enlarged view of IIIB part in FIG. 3A.

Preferably, the tool holder 16 has a plurality (two in the present embodiment) of anti-rotation grooves 25. The plurality of anti-rotation grooves 25 are rotationally symmetrically arranged about the shank axis 12. The anti-rotation groove 25 extends parallel to the shank axis 12 on an inner circumferential surface of the cylinder chamber 15. A length of the anti-rotation groove 25 in the direction of the shank axis 12 may be set to any length according to the size of the workpiece or the burr to be removed. Preferably, the anti-rotation groove 25 has a length of 1 to 5 times, more preferably 1.2 to 3.5 times, as a cutting edge length 32 of the tool 23. As shown in FIGS. 3A and 3B, the anti-rotation groove 25 has a U-shaped cross-sectional shape. The anti-rotation groove 25 is formed along the outer periphery of the anti-rotation body 37. A width of the anti-rotation groove 25 is smaller than a diameter of the anti-rotation body 37.

Figures 4A, 4B:
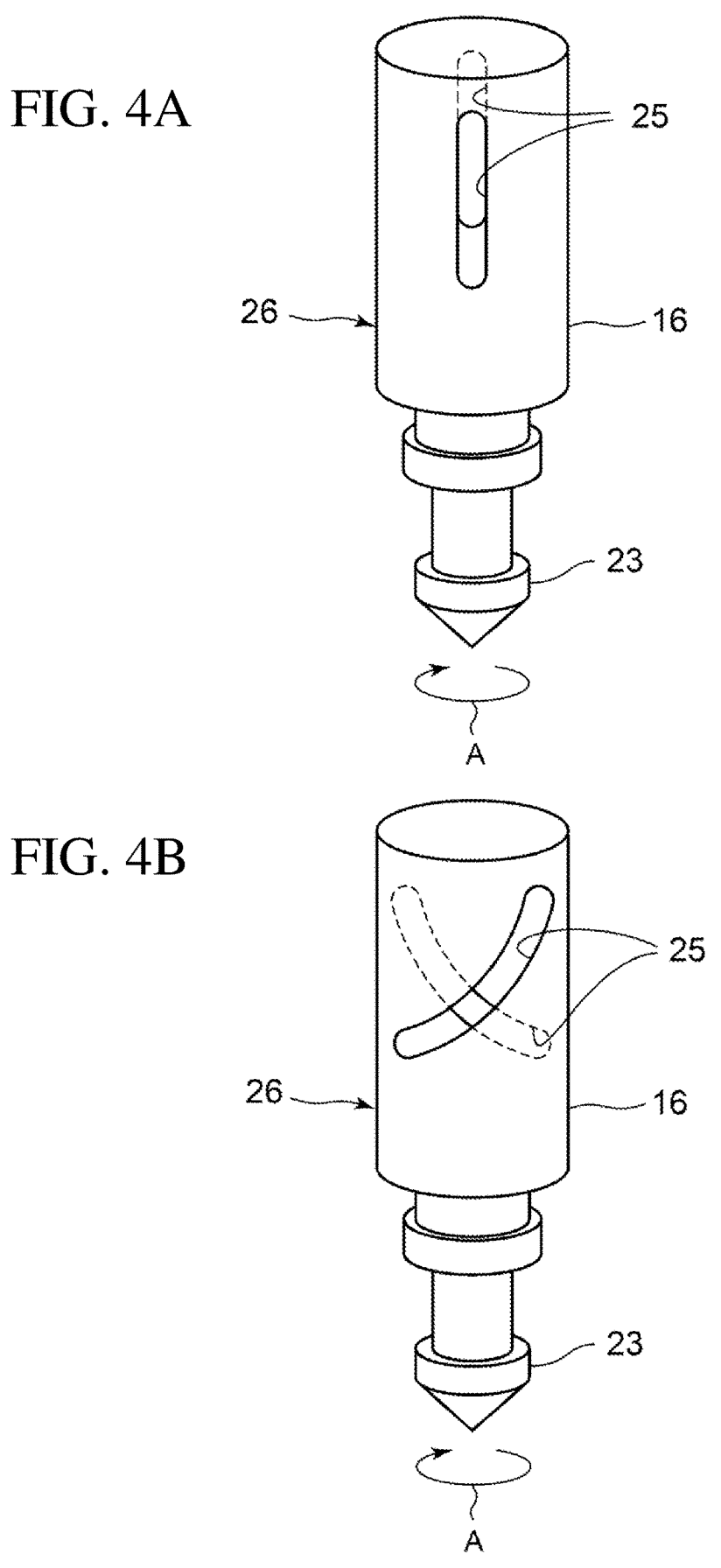

The anti-rotation groove 25 is not limited to a shape extending parallel to the shank axis 12, as shown in FIG. 4A. The anti-rotation groove 25 may have any shape may as long as the anti-rotation body 37 is capable of reciprocating and transmitting a rotational torque from the shank 11 to the tool holder 16 via the anti-rotation body 37 and the anti-rotation groove 25. For example, as shown in FIG. 4B, the anti-rotation groove 25 may have a spiral (string winding) shape that advances toward the basal end in a direction opposite to the rotation direction of the tool 23.

Returning to FIG. 1, the tool holding hole 28 opens toward the distal end of the tool holder 16 and is located along the shank axis 12. The tool 23 is received and held in the tool holding hole 28. Any tool 23 may be selected depending on the size, shape, and the like of the burr.

At the time of processing, the pusher 19 freely reciprocates in the cylinder chamber 15 by balancing a thrust force acting on the tool holder 16 from the workpiece and a restoring force of the first elastic body 21. When the tool holder 16 is removed, the pusher 19 is pushed out to the first elastic body 21 and moves to the distal end of the tool holder 16.

The anti-rotation body 37 is, for example, a ball. As shown in FIGS. 3A and 3B, each anti-rotation body 37 is held by the anti-rotation body holding surface 39 of the anti-rotation body holding hole 17 and the pressing surface 33. When the anti-rotation body 37 moves along the anti-rotation groove 25, the tool holder 16 reciprocates in the cylinder chamber 15. The reciprocating end of the pusher 19 is determined by the range in which the anti-rotation body 37 can move along the anti-rotation groove 25.

As shown in FIG. 3B, the anti-rotation body holding surface 39 is inclined toward the rotation direction of the tool 23 with respect to the radial direction. That is, as shown in FIG. 3B, the anti-rotation body holding surface 39 is inclined with respect to a straight line 42 that passes through a center of the anti-rotation body and that is perpendicular to the body center axis. As can be seen in FIG. 3B, the straight line 42 defines the radial direction. The anti-rotation body holding surface 39 is a cylindrical surface. An anti-rotation body retaining portion 41 is disposed at a distal end portion (radially inner side) of the anti-rotation body holding surface 39 on the tool holder 16 side. The anti-rotation body retaining portion 41 is located on the opposite side in the rotation direction and has a retaining spherical surface 43. That is, as shown in FIG. 3B, the retaining spherical surface 43 covers only a portion of a full sphere and may thus be described as "partially" spherical. For example, about 40% of the diameter of the anti-rotation body 37 protrudes from the body 13. The anti-rotation body 37 is pressed by the pressing surface 33 and the anti-rotation body holding surface 39 (cylindrical surface) of the anti-rotation body holding hole 17 to transmit the rotational torque of the shank 11 to the tool holder 16 via the anti-rotation groove 25.

The cover 31 includes the pressing surface 33, a relief portion 35, and an internal threaded portion 22. The cover 31 has the internal threaded portion 22 on its inner peripheral surface. The cover 31 is hollow cylindrical as a whole. The cover 31 covers an outer peripheral surface of the body 13. The internal threaded portion 22 is disposed at a basal end portion of the inner peripheral surface on the cover 31. The internal threaded portion 22 is fitted with the external thread portion 14. The relief portion 35 is disposed at a distal end portion of the inner peripheral surface on the cover 31. The relief portion 35 is, for example, a circumferential groove.

Figure 5:
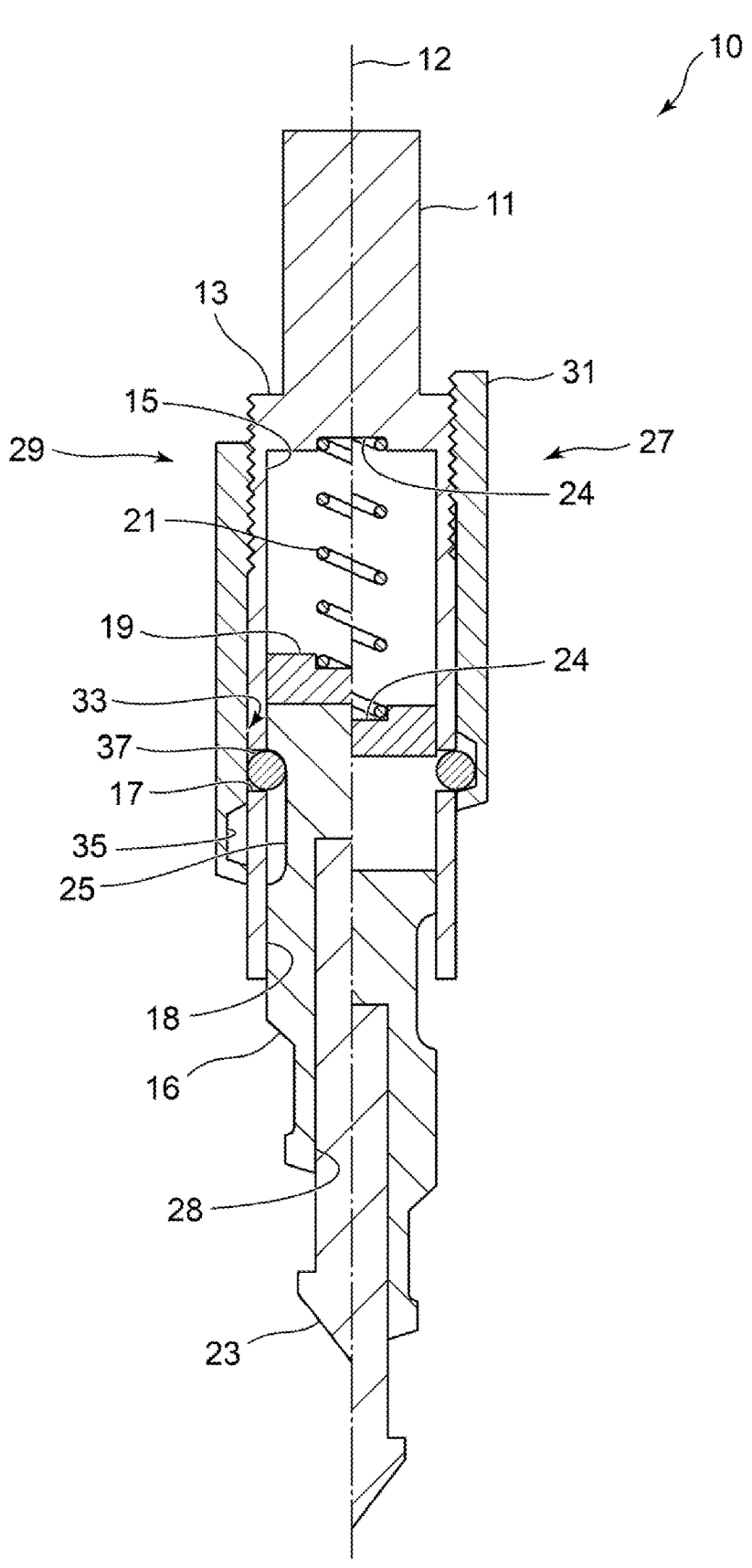
FIG. 5 is a longitudinal sectional view of the deburring tool of the first embodiment during attaching or detaching.

A right half of FIG. 5 shows the state in which the tool holder 16 is detached from the body 13. The cover 31 is movable between a processing position 29 and a detaching position 27. At the processing position 29, the pressing surface 33 of the cover 31 covers the anti-rotation body 37 and the anti-rotation body holding hole 17. As the anti-rotation body 37 is held by the pressing surface 33, the anti-rotation body 37 is kept in the anti-rotation groove 25. When the cover 31 moves to the detaching position 27, the relief portion 35 is aligned with the anti-rotation body holding hole 17 in the direction of the shank axis 12. At this time, the anti-rotation body 37 is accommodated in the relief portion 35 to move radially outward of the tool holder holding hole 18.

At the processing position 29, the tool holder 16 abuts the pusher 19. At the processing position 29, the pusher 19 and the tool holder 16 are pressed by the first elastic body 21.

When the cover 31 is moved to the detaching position 27, the relief portion 35 moves to the position of the anti-rotation body holding hole 17. The tool holder 16 is pressed by the first elastic body 21 via the pusher 19. Then, the basal end portion of the anti-rotation groove 25 of the tool holder 16 pushes the anti-rotation body 37 toward the distal end. The anti-rotation body 37 thus moves to the relief portion 35, so that the anti-rotation body 37 is disconnected from the tool holder 16. When the first elastic body 21 further presses the pusher 19, the tool holder 16 is pushed toward the distal end. In this way, the tool holder 16 is detached.

When the tool holder 16 is attached, the cover 31 is moved to the detaching position 27, and the tool holder 16 is inserted into the tool holder holding hole 18. When the anti-rotation groove 25 reaches the position of the anti-rotation body holding hole 17, the cover 31 is moved to the processing position 29. The anti-rotation body 37 thus moves radially inward so that the anti-rotation body 37 comes into contact with the anti-rotation body holding hole 17 and the anti-rotation groove 25 from the relief portion 35. Then, the tool holder 16 is connected to the anti-rotation body 37.

The anti-rotation body holding surface 39 of the anti-rotation body holding hole 17 is inclined in the rotation direction of the tool 23 with respect to the radial direction, which presses the anti-rotation body 37 toward the center of the tool holder 16. This reliably and effectively transmits the rotational torque of the shank 11 to the anti-rotation groove 25.

Figures 6A, 6B, 6C, 6D:
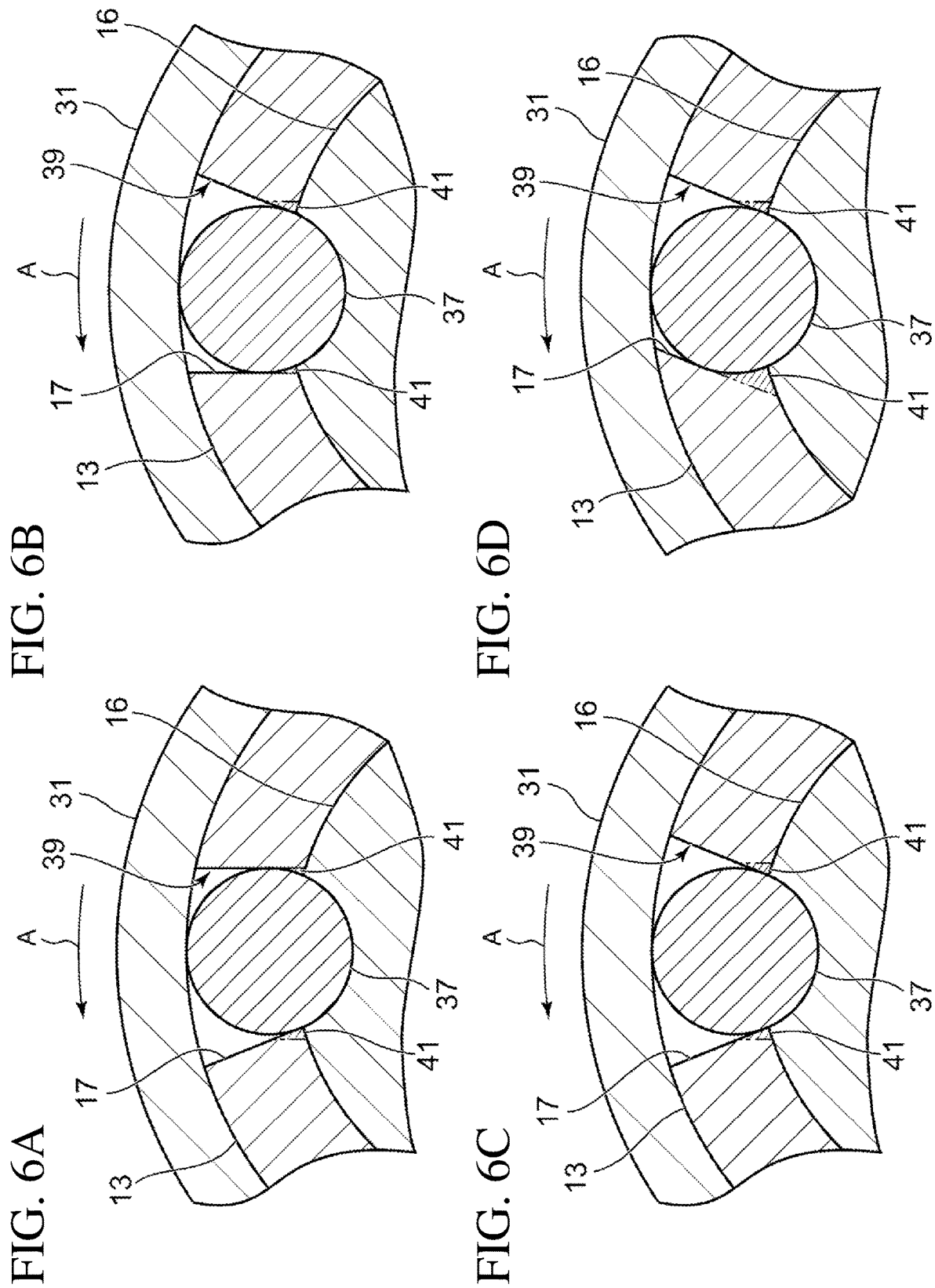
FIG. 6A to 6D is a modification of FIG. 3B.

As shown in FIGS. 6A to 6D, the shape of the anti-rotation body holding surface 39 is not limited to a cylindrical surface. The anti-rotation body holding surface 39 may have any shape as long as torque is transmitted to the anti-rotation groove 25 and the anti-rotation body 37 does not fall off at the time of detaching the tool holder 16. For example, as shown in FIGS. 6A and 6B, the anti-rotation body holding surface 39 may have a surface partially parallel to the radial direction. As shown in FIG. 6C, the anti-rotation body holding surface 39 may have a conical surface having a reduced diameter toward the shank axis 12. Further, as shown in FIG. 6D, the anti-rotation body holding surface 39 may be inclined in the direction opposite to the rotation direction of the tool 23.

Figure 7:
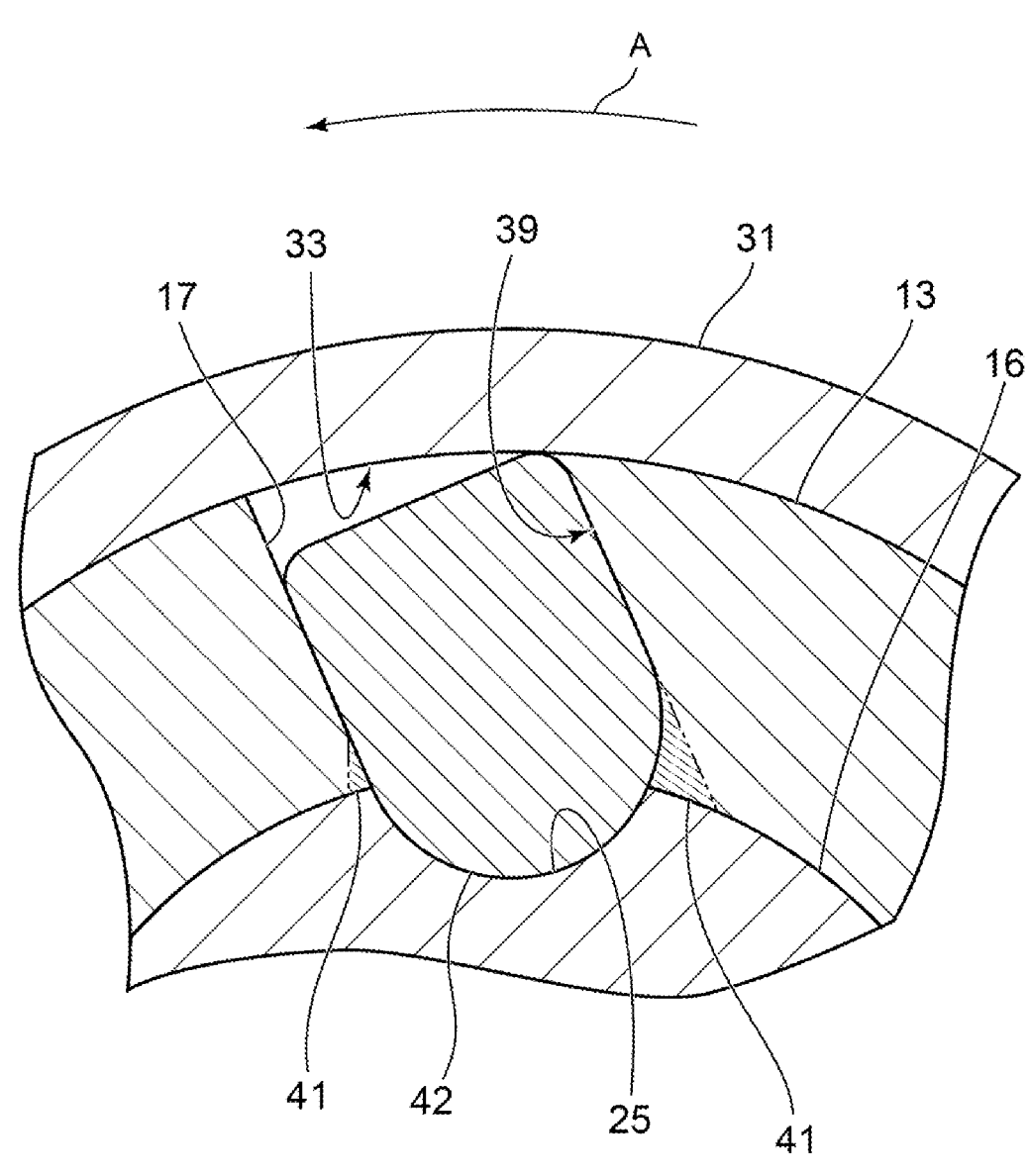
FIG. 7 is a modification of the anti-rotation body.

The anti-rotation body 37 is not limited to a ball shape. The anti-rotation body 37 may have any shape as long as the anti-rotation body 37 moves along the anti-rotation groove 25, the torque is transmitted to the anti-rotation groove 25, and the anti-rotation body 37 is movable to the relief portion 35 when the tool holder 16 is detached. For example, as shown in FIG. 7, the anti-rotation body may be a pin 42. An end surface of the pin 42 toward the tool holder 16 is a hemispherical surface. The end surface of the pin 42 in contact with the pressing surface 33 has a rounded shape. The pin 42 is disposed along the inclination of the anti-rotation body holding surface 39. When the tool holder 16 is detached from the body 13, the pin 42 moves along the anti-rotation body holding surface 39 to the relief portion 35.

Second Embodiment

Figure 8:
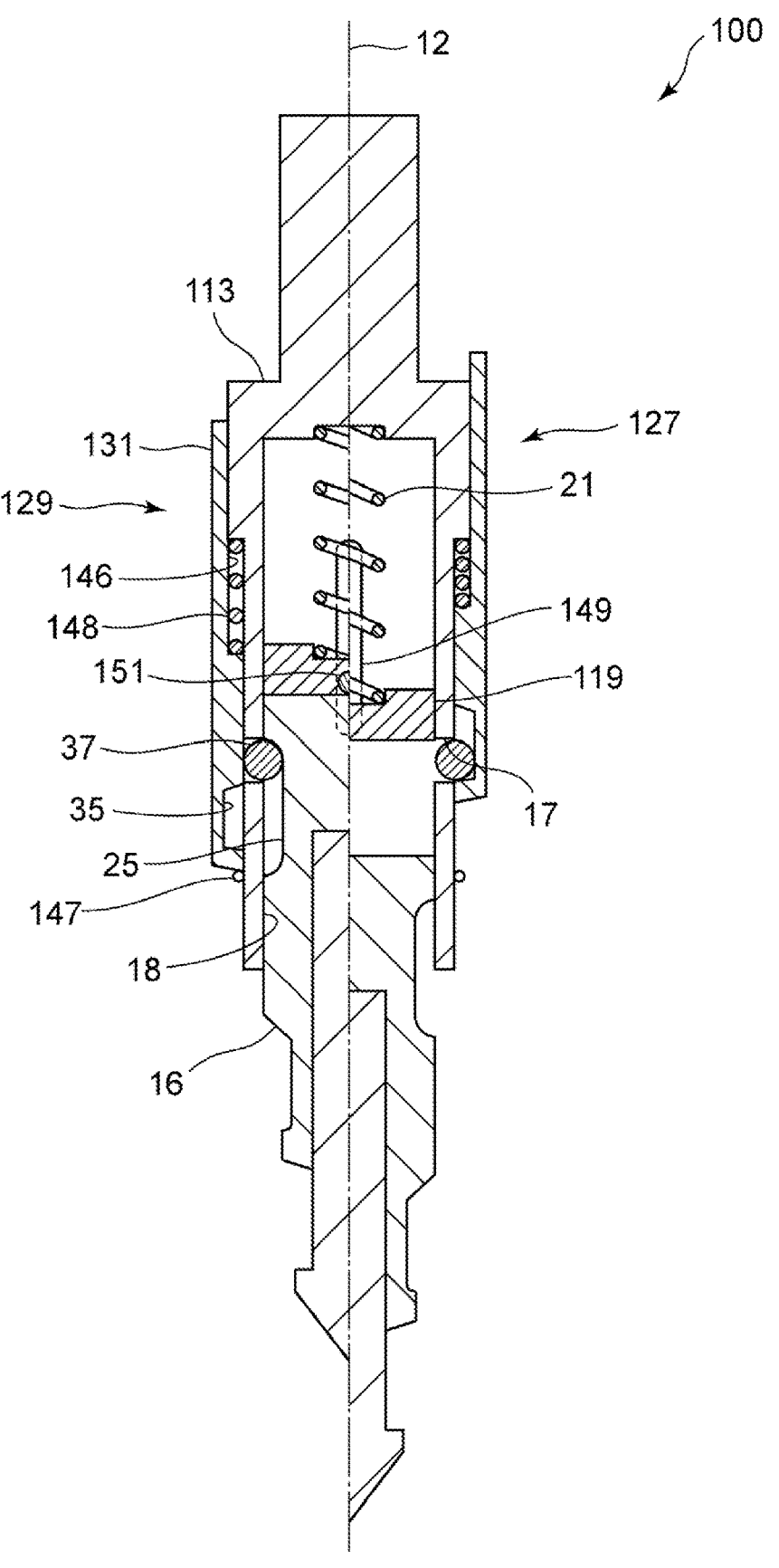
FIG. 8 is a longitudinal sectional view of a deburring tool of a second embodiment.

A deburring tool 100 according to the present embodiment, which is an example of the processing tool 10, will be described. As shown in FIG. 8, the deburring tool 100 of the present embodiment includes a body 113, a pusher 119, a cover 131, an elastic body chamber 146, a second elastic body 148 (compression coil spring), and a stopper 147. The elastic body chamber 146 is located between the body 113 and the cover 131. The right half of FIG. 8 shows a state in which the tool holder 16 is detached from the body 113.

Figure 9:
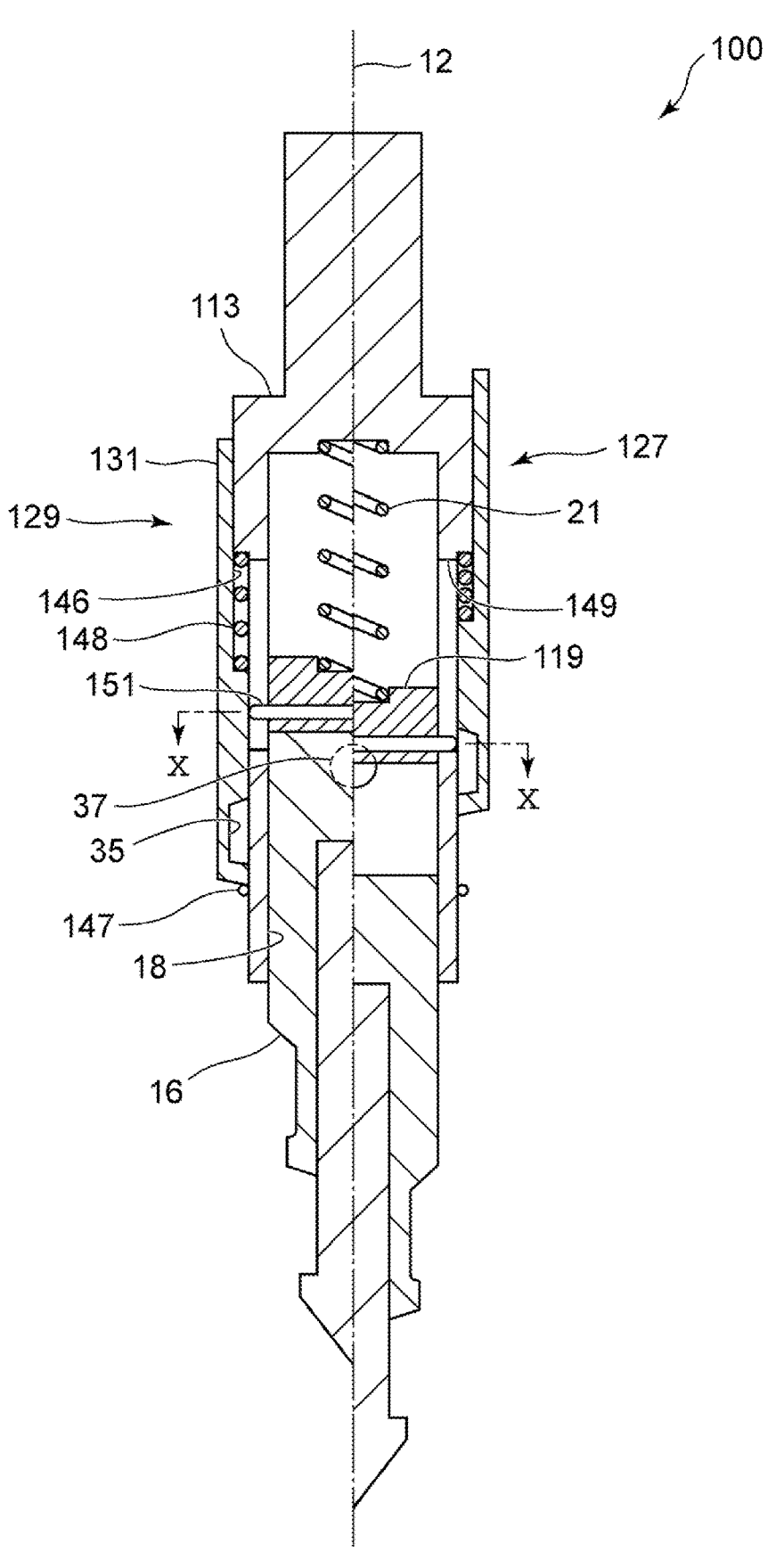
FIG. 9 is a longitudinal sectional view of the deburring tool of the second embodiment.
Figure 10:
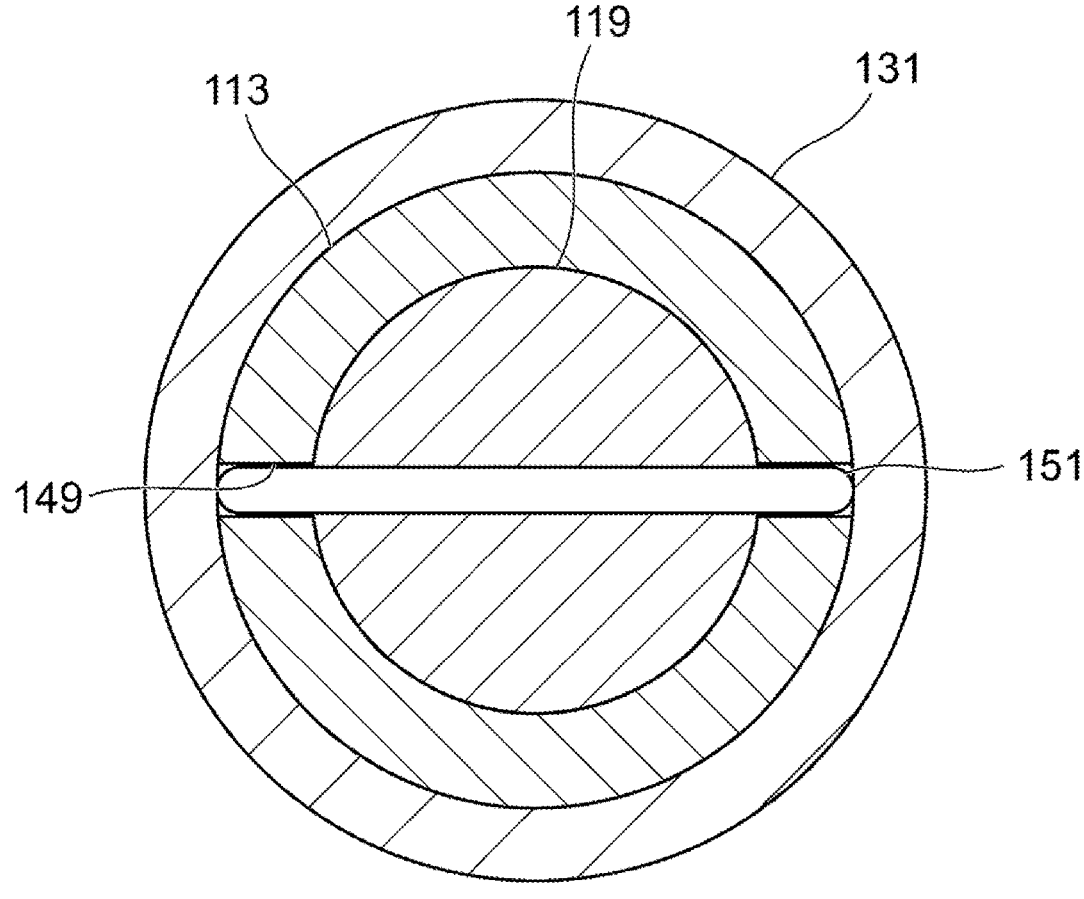
FIG. 10 is a cross-sectional view taken along line X-X in FIG. 9.

FIG. 9 is a longitudinal sectional view of the deburring tool 100 of the present embodiment rotated 90 degrees about the shank axis 12 with respect to FIG. 8. FIG. 10 is a cross-sectional view taken along line X-X in FIG. 9. As shown in FIGS. 9 and 10, the body 113 has two elongated holes 149. Each elongated hole 149 extends parallel to the shank axis 12. The elongated hole 149 may be a through hole that penetrates the body 113. The elongated hole 149 may be a groove formed on an inner surface of the body 113.

When the anti-rotation groove 25 has a spiral shape, the elongated hole 149 may have the corresponding spiral shape.

The pusher 119 has a pin member 151 that penetrates in the radial direction. Both ends of the pin member 151 slide through the elongated hole 149. For example, the pin member 151 is fixed to the pusher 119. Restricting the reciprocating stroke of the pin member 151 to the axial length of the elongated hole 149 prevents the pusher 119 from falling off from the body 113.

The cover 131 is hollow cylindrical as a whole. The cover 131 covers an outer peripheral surface of the body 113. An inner surface of the cover 131 slides on the outer peripheral surface of the body 113. The compression coil spring 148 is accommodated in the elastic body chamber 146. The cover 131 is pressed toward the distal end by the compression coil spring 148. The stopper 147 prevents the cover 131 from falling off.

Other configurations of the deburring tool 100 of the present embodiment are the same as those of the deburring tool 10 of the first embodiment.

When the tool holder 16 is detached from the deburring tool 100, the cover 131 is pushed toward basal end from the processing position 129 to the detaching position 127. At the detaching position 127, the cover 131 moves the relief portion 35 to the anti-rotation body holding hole 17 and the anti-rotation body 37. At this time, when the tool holder 16 is pulled toward the distal end, the anti-rotation body 37 is pushed out to the relief portion 35 by the anti-rotation groove 25. This releases the holding of the tool holder 16 by the anti-rotation body 37, and the tool holder 16 is detachable from the body 113.

When the tool holder 16 is attached, the cover is moved to the detaching position 127, and the tool holder 16 is inserted into the tool holder holding hole 18. When the anti-rotation groove 25 reaches the position of the anti-rotation body holding hole 17, the cover 131 is moved to the processing position 129. The anti-rotation body 37 thus moves from the relief portion 35 to the anti-rotation body holding hole 17 and the anti-rotation groove 25 so that the tool holder 16 is engaged with the anti-rotation body 37.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST 10,100 Deburring tool
11 Shank
12 Shank axis
13, 113 Body
14 External thread
15 Cylinder chamber
16 Tool holder
17 Anti-rotation body holding hole
18 Tool holder holding hole
19, 119 Pusher
21 First elastic body
22 Internal thread
23 Tool
24 Spring holding hole
25 Anti-rotation groove
26 Outer cylindrical surface
27, 127 Detaching position
28 Tool holding hole
29, 129 Processing position
31, 131 Cover
33 Pressing surface
35 Relief portion
37 Anti-rotation body
39 Anti-rotation body holding surface
147 Stopper
148 Second elastic body
149 Elongated hole
151 Pin member

What is claimed is:

1. A processing tool, comprising:
a body extending along a body center axis, the body including
a cylinder chamber located inside the body and extending along the body center axis, the cylinder chamber having a tool holder holding hole having an opening toward a distal end, and
an anti-rotation body holding hole penetrating the body in a radial direction;
a tool holder having an anti-rotation groove formed on an outer peripheral of the tool holder, the tool holder disposed in the cylinder chamber, the tool holder configured to reciprocate in the cylinder chamber;
a first elastic body disposed inside the cylinder chamber, the first elastic body configured to urge the tool holder toward the distal end;
a cover disposed outside the body, the cover configured to reciprocate along the body center axis between a detaching position and a processing position, the cover including,
a pressing surface configured to cover the anti-rotation body holding hole at the processing position, and
a relief portion recessed from an inner side of the cover to radially outward; and an anti-rotation body held in the anti-rotation body holding hole, the anti-rotation body configured to move between the anti-rotation groove and the pressing surface, the anti-rotation body configured to be accommodated in the relief portion when the cover is positioned at the detaching position and the tool holder is pulled from the tool holder holding hole;

wherein sidewalls of the anti-rotation body holding hole are inclined in a rotation direction of the processing tool with respect to a straight line that defines the radial direction; and wherein the anti-rotation body has a spherical outer surface and the anti-rotation body holding hole has an anti-rotation body holding surface therein with an anti-rotation body retaining portion, the anti-rotation body retaining portion having a partially spherical surface that conforms to the spherical outer surface of the anti-rotation body such that, when the cover is positioned at the detaching position and the tool holder is pulled from the tool holder holding hole, the inclined sidewalls of the anti-rotation body holding hole and the partially spherical surface of the anti-rotation body retaining portion prevent the anti-rotation body from falling into the body.

2. The processing tool according to claim 1, wherein the anti-rotation body holding surface is inclined with respect to a straight line that passes through a center of the anti-rotation body and that is perpendicular to the body center axis.

3. The processing tool according to claim 1, wherein a center of the anti-rotation body is positioned in the anti-rotation body holding hole with the anti-rotation body being in contact with the pressing surface of the cover and the anti-rotation groove.

4. The processing tool according to claim 1, wherein the anti-rotation body is a ball.

5. The processing tool according to claim 1, wherein the anti-rotation body is a pin.

6. The processing tool according to claim 1, wherein the anti-rotation groove extends parallel to the body center axis.

7. The processing tool according to claim 1, wherein the anti-rotation groove is spiral shape that advances toward a basal end in a direction opposite to a rotational direction of a deburring tool.

8. The processing tool according to claim 1, further comprising:

a pusher configured to reciprocate inside the cylinder chamber to urge the tool holder toward a the distal end.

9. The processing tool according to claim 1, further comprising:

an elastic body chamber located between the body and the cover; and a second elastic body disposed inside the elastic body chamber to urge the cover from the detaching position to the processing position.

10. The processing tool according to claim 1, wherein a tool is detachably attached to the tool holder.

11. The processing tool according to claim 1, further comprising:

a shank extending along the body center axis and connected to the body.

12. The processing tool of claim 1, wherein the anti-rotation body retaining portion comprises a first anti-rotation body retaining portion with a partially spherical surface behind the anti-rotation body with respect to the rotation direction and a second anti-rotation body retaining portion with a partially spherical surface forward of the anti-rotation body with respect to the rotation direction, the first anti-rotation body retaining portion being larger than the second anti-rotation body retaining portion.

* * * * *